United States Patent [19]

Yates et al.

[11] Patent Number: 4,915,804

[45] Date of Patent: Apr. 10, 1990

[54] TITANATE BOUND PHOTOSENSITIZER FOR PRODUCING SINGLET OXYGEN

[75] Inventors: Stephen F. Yates, Arlington Heights, Ill.; Mary L. Good, Convent Station, N.J.; Romulus Gaita, Morton Grove, Ill.

[73] Assignee: Allied-Signal Inc., Morris Township, Morris County, N.J.

[21] Appl. No.: 287,317

[22] Filed: Dec. 20, 1988

[51] Int. Cl.$^4$ .................... B01J 19/08; B01J 31/00; B05D 7/00; B05D 3/02

[52] U.S. Cl. .................... 204/157.5; 204/157.49; 204/157.76; 204/158.21; 204/158.2; 204/157.15; 502/171; 502/172; 502/162; 502/168; 502/167; 427/221; 427/216; 427/389.7; 427/393.6; 522/904; 528/9; 528/10

[58] Field of Search .............. 502/171, 172, 162, 168, 502/167; 204/157.5, 157.49, 157.76, 158.21, 158.2, 157.15; 427/221, 216, 389.7, 393.6; 522/904, 6, 65, 68; 528/9, 10

[56] References Cited

U.S. PATENT DOCUMENTS

| | | | |
|---|---|---|---|
| 3,951,797 | 4/1976 | Seely | 204/158.21 |
| 4,104,204 | 8/1978 | Williams | 522/904 |
| 4,290,869 | 9/1981 | Pijeon | 522/99 |
| 4,315,998 | 2/1982 | Neckers et al. | 525/332 |
| 4,391,963 | 7/1983 | Shirahata | 522/904 |
| 4,435,259 | 3/1984 | Chang | 522/99 |
| 4,436,715 | 3/1984 | Schapp | 204/157.5 |
| 4,534,838 | 8/1985 | Lin | 522/904 |
| 4,536,265 | 8/1985 | Fabrizio | 522/904 |
| 4,579,837 | 4/1986 | Busch | 502/158 |
| 4,666,953 | 5/1987 | Klemarczyk | 522/904 |
| 4,849,076 | 7/1989 | Neckers | 204/157.15 |

FOREIGN PATENT DOCUMENTS

| | | | |
|---|---|---|---|
| 1044639 | 12/1978 | Canada | 204/91.01 |
| 1054971 | 5/1979 | Canada | 204/91.22 |

OTHER PUBLICATIONS

N. J. Turro, MODERN MOLECULAR PHOTOCHEMISTRY, Benjamin/Cummings Publishing Co., Inc., pp. 309-311, (1978).

*Primary Examiner*—John F. Niebling
*Assistant Examiner*—Ben C. Hsing
*Attorney, Agent, or Firm*—Frank S. Molinaro; Harold N. Wells; Gerard P. Rooney

[57] ABSTRACT

This invention relates to a photosensitizer which is bound to a titanate polymer, a method of preparing the bound photosensitizer and a process for using the bound photosensitizer. The photosensitizers which may be used in the invention include rose bengal, azure blue, rhodamine B, fluorescein and eosin. The photosensitizer is attached to the titanate by displacing a ligand on the titanate with a hydroxyl group on the photosensitizer. Finally, the bound photosensitizer may be used to oxidize undesirable oxidizable compounds present in a hydrocarbon or aqueous fraction. One specific example is the sweetening of kerosene which involves oxidizing the mercaptans contained in the kerosene to disulfides.

22 Claims, No Drawings

TITANATE BOUND PHOTOSENSITIZER FOR PRODUCING SINGLET OXYGEN

BACKGROUND OF THE INVENTION

Diatomic oxygen in its ground state is a paramagnetic molecule because it has a triplet ground state. Electronic excitation can produce either of two excited states, both of which are diamagnetic singlet states. The lower excited state, $^1\Delta_g$, has an energy of 22.5 kcal/mol above the ground state while the higher excited state, $^1\Sigma_g$, has an energy of 37.5 kcal/mol. Only the lower excited state has a long enough lifetime to be chemically active in solution and is normally referred to as "singlet oxygen", $^1O_2$.

Singlet oxygen has been found to be a much stronger oxidizing agent than ground state molecular oxygen. Singlet oxygen has a calculated reduction potential of 1.7 V which makes it a better oxidizing agent (in non-acidic conditions) than ozone, hydrogen peroxide, sodium hypochlorite and chlorine dioxide. Thus, singlet oxygen can be used in a number of oxidation reactions such as synthesis of organic compounds, removal of humic acid from water, removal of phenols from waste streams, removal of cyanide from electroplating waste, oxidation of mercaptans in hydrocarbon streams and destruction of bacteria in various streams.

The usual method of generating singlet oxygen is by energy transfer from light and a photosensitizer. The role of the photosensitizer is to absorb the light and transfer its energy to the oxygen thereby forming singlet oxygen. The mechanism for producing singlet oxygen is well known in the art and the photosensitizers which can be used to produce singlet oxygen are also well known. Illustrative of these photosensitizers are rose bengal, methylene blue, eosin, chlorophyll, fluorescein, acridine orange, porphyrins, phthalocyanines, etc.

The prior art teaches that these photosensitizers are usually used in a homogeneous phase; that is, the photosensitizer is dissolved in the reaction medium. This has the disadvantage that the photosensitizer must be separated from the reaction product. Even if separation is possible, complete separation is usually not achieved which means that fresh photosensitizer must be added to the fresh reaction medium. Since photosensitizers are expensive, the loss of photosensitizer may make the overall process uneconomical. Moreover, the effective concentration of photosensitizer which can be employed is limited not only owing to the increased difficulty of separating the photosensitizer from the products, but also owing to the fact that at higher concentrations the photosensitizers tend to form dimers and higher aggregates which reduce their effectiveness as photosensitizers.

One way to solve these problems is to carry out the photooxidation in a heterogeneous phase. Such a system is disclosed in U.S. Pat. No. 4,315,998 (see also Canadian patents 1,044,639 and 1,054,971). The '998 patent discloses chemically binding the photosensitizer to a polymeric material. The polymer used in the '988 patent is a modified crosslinked polystyrene polymer to which the photosensitizer is bound through a nucleophilic displacement reaction. However, crosslinked polystyrene has several disadvantages. One disadvantage is that singlet oxygen can interact with vibrational levels of C–H bonds, thereby decaying back to the ground state and therefore decreasing the lifetime of singlet oxygen. Also, crosslinked polystyrene has a tendency to swell and deteriorate in organic solvents.

Thus, there is a need for a polymer bound photosensitizer which utilizes all the available photosensitizers and is stable in organic solvents. Applicants have developed such a polymer bound photosensitizer. Applicants' polymer bound photosensitizer consists of a titanate polymer (polytitanate) to which is bound a photosensitizer and which is supported on a solid support. The photosensitizer is bound to the polytitanate by displacing a ligand on an organo titanium compound with a hydroxyl group on the photosensitizer, thereby forming a carbon-oxygen-titanium bond between the photosensitizer and the organo titanium compound.

Comparing the polytitanate bound photosensitizer of the present invention with the polystyrene bound photosensitizer of the prior art shows several striking differences. First, the polymer used in the present invention is a titanium based polymer whereas the '998 polymer is a carbon based polymer. Second, the polytitanate does not swell in organic solvents whereas polystyrene does swell in organic solvents. Third, the number of C–H bonds in the polytitanate bound photosensitizer is greatly reduced versus the polystyrene bound photosensitizer of the '998 patent which should increase the lifetime of singlet oxygen. For all of these reasons, applicants' invention represents a significant improvement in the art.

Not only have applicants found a new way to bind a photosensitizer to a polymer, applicants have also found a new use for the polytitanate bound photosensitizer. This use involves using a titanate bound photosensitizer, e.g., rose bengal, to oxidize mercaptans which are present in various hydrocarbon streams. The standard way of treating a hydrocarbon stream containing mercaptans is to first contact the hydrocarbon fraction with an aqueous alkaline solution, thereby transferring the mercaptans into the aqueous phase, followed by oxidation of the mercaptans with oxygen in the presence of a metal phthalocyanine catalyst. This process has the disadvantage in that it forms a waste alkaline stream which must be disposed. By using photooxidation, the disposal problems associated with the use of an alkaline solution are eliminted. Thus, the present invention solves a problem in the hydrocarbon processing industry which has become more important as waste disposal sites have become harder to find.

SUMMARY OF THE INVENTION

This invention relates to a supported photosensitizer coating, a method of preparing the supported photosensitizer coating and a method of using the supported photosensitizer coating.

Accordingly, one embodiment of the invention is a supported photosensitizer coating comprising a polytitanate bound photosensitizer supported on a solid support, the polytitanate bound photosensitizer characterized as the displacement reaction product of an organo titanium compound and a photosensitizer containing a hydroxyl group which is capable of displacing a ligand on the titanium compound, and forming a titanium-oxygen-carbon bond.

Another embodiment of the invention is a method of preparing a supported photosensitizer coating comprising:

(a) applying a coating to a solid support, the coating comprising an organo titanium compound and a photosensitizer; and (b) heating the coated substrate at a temperature and for a time sufficient to form a polytitanate, and bind the photosensitizer to the polytitanate.

A specific embodiment of the invention is a method of preparing a supported rose bengal coating comprising applying a coating to a glass plate, the coating composed of an isopropanol/methanol solution containing rose bengal and titanium tetraisopropoxide. The coated glass plate is heated at 85° C. for 20 seconds, thereby binding the rose bengal to the polytitanate.

Yet another embodiment of the invention is a method of oxidizing undesirable oxidizable compounds present in a hydrocarbon or aqueous fraction comprising contacting the hydrocarbon or aqueous fraction with a titanate bound photosensitizer in the presence of molecular oxygen and light, thereby oxidizing the oxidizable compound by reacting the oxidizable compound with singlet oxygen which is generated from molecular oxygen by energy transfer from the light and the titanate bound photosensitizer, and producing a treated hydrocarbon or aqueous fraction.

Yet another specific embodiment is a method of oxidizing mercaptans present in a hydrocarbon fraction comprising contacting the hydrocarbon fraction with rose bengal bound to titanate in the presence of molecular oxygen and light, thereby oxidizing the mercaptans to disulfides and producing a sweet hydrocarbon fraction.

Other objects and embodiments will become more apparent after a more detailed description of the invention.

DETAILED DESCRIPTION OF THE INVENTION

As indicated, the present invention relates to a supported photosensitizer coating, a method of preparing the supported photosensitizer coating and a method of oxidizing oxidizable compounds using the supported photosensitizer coating.

Accordingly, the essential features of the present invention are a coating and a solid support. The coating contains a photosensitizer which is attached to a polytitanate. A polytitanate is a polymeric titanium compound having the formula,

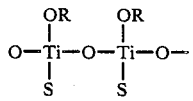

where R may be hydrogen, alkyl, aryl, alkaryl or aralkyl and S is a support or a titanium atom which extends the polymer.

A photosensitizer is a compound which promotes a photochemical reaction by absorbing light and transferring it to another compound which carries out the reaction. Illustrative of the photosensitizers which can be used in the present invention are rose bengal, rhodamine B, azure blue, fluorescein and eosin. The first criterion used to choose a photosensitizer is that the excited state of the photosensitizer be at a higher energy than the singlet oxygen energy state. For a more complete explanation of energy-transfer mechanisms see N. J. Turro, *MODERN MOLECULAR PHOTOCHEMISTRY*, Benjamin/Cummings Publishing Co. Inc., p. 309-311 (1978). The other criterion is that the photosensitizer contain a hydroxyl group or be modified to contain a hydroxyl group. Thus, for the purpose of this invention when reference is made to a photosensitizer it is to be understood that if the photosensitizer does not naturally contain a hydroxyl group, it has been modified to include such a group. For example, when reference is made to azure blue, it is to be understood that what is meant is azure blue which has been modified to contain a hydroxyl group.

The photosensitizer is bound to the polytitanate through a carbon-oxygen-titanium covalent bond. This bond is formed by a displacement reaction between a photosensitizer and an organo titanium compound (titanate). In the displacement reaction, a hydroxyl group on the photosensitizer displaces a ligand on the organo titanium compound which undergoes polymerization. The organo titanium compound is further characterized in that the organic group is bound to the titanium via a carbon-oxygen-titanium bond, e.g., alkoxides. Further, the hydroxyl group on the photosensitizer may be a carboxylic hydroxyl group, i.e., COOH. However, the hydrolytic stability of the resulting compound using a COOH group is much lower than the hydrolytic stability of an OH group. Thus, hydroxyl groups (OH) directly bound to a carbon on the photosensitizer are preferred.

Finally, the other essential component is a solid support on which is supported the polytitanate bound photosensitizer. The solid support may be selected from the group consisting of glass hollow fibers, glass, ceramic or metal plates, spheres, rings, helices and small tubes. Preferred solid supports are glass spheres, plates and helices.

The method of preparing a supported photosensitizer coating first involves preparing a coating solution which can be applied to a support. Thus, solutions containing the titanium compound and the photosensitizer are prepared and admixed. The criteria used in selecting the solvent are that the titanium compound and photosensitizer be soluble in the solvent and that the solvent not react with the above components. Polar organic compounds meet these criteria. Illustrative of the solvents which may be used are methanol, isopropanol, 2-butanone, acetone, ethyl acetate and mixtures thereof.

In order to carry out the displacement reaction, it is necessary that the photosensitizer contain a hydroxyl group in its molecular structure. The hydroxyl group may occur naturally in the photosensitizer structure, e.g., rose bengal, or may be incorporated into the photosensitizer by a separate reaction. For example, azure blue or other nitrogen containing photosensitizers which do not contain a hydroxyl group, can be reacted with a hydroxy alkyl halide such as 2-chloroethanol or with an epoxide such as ethylene oxide to attach a hydroxyl group to the photosensitizer. Alternatively, aromatic photosensitizers can be reacted Friedel-Crafts conditions with an acyl halide such as acetyl chloride to make an aryl alkyl ketone which can then be reduced to the alcohol with reducing agents such as $NaBH_4$ or $LiAlH_4$.

As previously mentioned, the organo titanium compounds which may be used in this invention are those in which the organic group is bound to the titanium through a carbon-oxygen-titanium bond. Illustrative of these compounds are titanium tetraisopropoxide, titanium tetrabutoxide, titanium tetrakis-2-ethylhexoxide, titanium acetylacetonate, titanium ethyl acetoacetonate, titanium triethanolamine and titanium lactate. These titanium compounds are dissolved in the same type of solvents used to dissolve the photosensitizer.

Having formed a coating solution, the coating is now applied to a solid support by means well known in the art, as indicated, the solid support may be selected from the group consisting of glass hollow fibers, glass, ceramic or metal spheres, plates, rings, helices and tubes. Glass spheres, plates and helices are preferred. Thus, a coating may be applied to a glass plate using a Consler rod. It is preferred that the glass plate be washed with an acid such as sulfuric acid prior to applying the coating.

The coated glass plate is now heated at a temperature of about 60° to about 110° C. for a time of about 10 seconds to about 3 minutes to polymerize the titanium compound to a polytitanate, to bind the photosensitizer to the polytitanate, and to bind the coating to the glass plate. The exact formula of the polytitanate bound photosensitizer is not known, although it is believed that the polymer may be represented by the general formula:

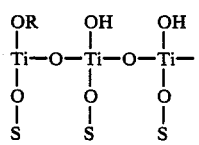

where R is a photosensitizer and S is a support. What is not exactly known is the length of the polymer chain and the exact distribution of the photosensitizer throughout the chain. Therefore, the photosensitizer coating is best described as the displacement reaction product of a titanium compound and a photosensitizer containing a hydroxyl group.

The above formula represents one monolayer of the polytitanate bound photosensitizer. The amount of coating present on the support is greater than one monolayer (usually several monolayers). In the case of several monolayers, the individual layers are bound by titanium-titanium bonds.

The polytitanate bound photosensitizer can be used to oxidize undesirable oxidizable compounds present in a hydrocarbon or aqueous fraction. Examples of the types of hydrocarbon or aqueous fractions which can be treated and the undesirable compound contained therein which will be oxidized are: removal of humic acid from water, removal of phenols from aqueous or organic waste streams, cyanide removal from electroplating waste, destruction of bacteria in aqueous streams, and oxidation of mercaptans in hydrocarbon fractions. The treatment process involves contacting the hydrocarbon or aqueous fraction with the polytitanate bound photosensitizer in the presence of oxygen and light. The oxygen may be added in any convenient way such as by sparging air into the system. The wavelength of the light used is also important and should be chosen so that the range of the wavelength of the light includes the wavelength of maximum absorbance for the photosensitizer. In general the wavelength of the light should be in the range of about 350 to about 800 nm. For example, when rose bengal is the photosensitizer a sodium arc lamp is preferred because it emits a considerable amount of radiant power at wavelengths between about 560 to about 620 nanometers. This range of wavelength encompasses the absorbance maximum of rose bengal which occurs at 568 nanometers.

The photooxidation process described above can be carried out either in a batch mode or a continuous flow mode. When a batch mode is desired, it is desirable that the fraction to be treated be contacted with the oxygen and titanate bound photosensitizer for a time of about 30 to about 450 min. Since the singlet oxygen which is generated by the interaction of the photosensitizer and oxygen is short lived (4–4,000 $\mu$sec.), it is also desirable to use a mixing method to ensure complete contact between the singlet oxygen generated at the polymer surface and the compound to be oxidized. For example, an annular reactor may be used and the hydrocarbon recirculated for a time sufficient to obtain the desired conversion.

In order to more fully illustrate the advantages to be derived from the instant invention, the following examples are set forth. It is to be understood that the examples are only by way of illustration and are not intended as an undue limitation on the broad scope of the invention as set forth in the appended claims.

EXAMPLE I

Rose bengal was attached to polytitanate by the following procedure. In a small beaker, 0.1 g titanium isopropoxide (Tyzor TPT, product of DuPont) was dissolved in 8.90 g of isopropanol. To this was added 1.0 g of a 1% solution of rose bengal in 3:1 isopropanol/methanol. The resulting red solution was cast on an acid-washed glass plate with a #3 Consler rod. The coating was then cured by placing the plate in an 85° C. oven for 20 seconds. The resulting pink film was resistant to removal by rubbing.

EXAMPLE II

A 39 mL glass chromatography column was equipped with a glass sparging tube reacting to the base of the column. The area around the tube was packed with 39 mL of glass beads coated with rose bengal/polytitanate (prepared as in Example I). A kerosene solution containing 361 ppm of mercaptans was allowed to flow slowly through the column while air was sparged through it. The column was irradiated with light from a Lucalox 400 watt sodium arc lamp (General Electric). The flow rate was varied and the results are tabulated below.

TABLE

| Flow Rate (mL/hr) | Mercaptan Concentration (ppm) |
|---|---|
| 9.5 | 272 |
| 18.9 | 267 |
| 52.5 | 271 |
| 180.0 | 277 |

As the table above shows, rose bengal attached to polytitanate is effective at oxidizing mercaptans.

We claim as our invention:

1. A supported photosensitizer coating comprising a polytitanate bound photosensitizer supported on a solid support, the polytitanate bound photosensitizer characterized as the displacement reaction product of an organo titanium compound and a photosensitizer containing a hydroxyl group which is capable of displacing a ligand on the titanium compound and forming a titanium-oxygen-carbon bond.

2. The supported photosensitizer coating of claim 1 where the photosensitizer is selected from the group consisting of rose bengal, azure blue, rhodamine B, fluorescein and eosin.

3. The supported photosensitizer coating of claim 1 where the photosensitizer is rose bengal.

4. The supported photosensitizer coating of claim 1 where the organo titanium compound is selected from the group consisting of titanium tetraisopropoxide, titanium tetrabutoxide, titanium tetrakis-2-ethylhexoxide, titanium acetylacetonate, titanium ethylacetoacetonate, titanium triethanolamine and titanium lactate.

5. The supported photosensitizer coating of claim 4 where the organo titanium compound is titanium tetraisopropoxide.

6. The supported photosensitizer coating of claim 1 where the solid support is selected from the group consisting of glass hollow fibers, glass, ceramic or metal spheres, plates, rings, helices and tubes.

7. A method of preparing a supported photosensitizer coating comprising:
   (a) applying a coating to a solid support, the coating comprising an organo titanium compound and a photosensitizer; and
   (b) heating the coated substrate at a temperature and for a time sufficient to form a polytitanate and bind the photosensitizer to the polytitanate.

8. The method of claim 7 where the photosensitizer is selected from the group consisting of rose bengal, azure blue, rhodamine B, fluorescein and eosin.

9. The method of claim 8 where the photosensitizer is rose bengal.

10. The method of claim 7 where the organo titanium compound is selected from the group consisting of titanium tetraisopropoxide, titanium tetrabutoxide, titanium tetrakis-2-ethylhexoxide, titanium acetylacetonate, titanium ethylacetoacetonate, titanium triethanolamine and titanium lactate.

11. The method of claim 7 where the heating is done at a temperature of about 60° to about 110° C. and a time of about 10 seconds to about 3 minutes.

12. The method of claim 7 where the solid substrate is selected from the group consisting of glass hollow fibers, glass, ceramic or metal spheres, plates, rings, helices and tubes.

13. A method of oxidizing undesirable oxidizable compounds present in a hydrocarbon or aqueous fraction comprising contacting the hydrocarbon or aqueous fraction with a polytitanate bound photosensitizer supported on a solid substrate in the presence of molecular oxygen and light, thereby oxidizing the oxidizable compound by reacting the oxidizable compound with singlet oxygen which is generated from molecular oxygen by energy transfer from the light and the polytitanate bound photosensitizer and producing a treated hydrocarbon or aqueous fraction.

14. The method of claim 13 where the sensitizer is selected from the group consisting of rose bengal, azure blue, rhodamine B, fluorescein and eosin.

15. The method of claim 13 where the molecular oxygen is obtained from air.

16. The method of claim 13 further characterized in that the treating of the hydrocarbon or aqueous fraction is carried out in a batch process.

17. The method of claim 16 where the hydrocarbon or aqueous fraction molecular oxygen, photosensitizer and light are contacted for a time of about 0.2 to about 10 hours.

18. The method of claim 13 further characterized in that the treating of the hydrocarbon or aqueous fraction is carried out in a continuous flow process.

19. The method of claim 18 where the hydrocarbon or aqueous fraction is flowed over the polytitanate bound photosensitizer at a flow rate of about 0.1 to about 5 mL/min.

20. The method of claim 13 where the light has a wavelength from about 350 to about 800 nm.

21. The method of claim 13 where the oxidizable compound is a mercaptan and is present in a hydrocarbon fraction.

22. The method of claim 13 where the oxidizable compound is a phenol and is present in an aqueous fraction.

* * * * *